March 4, 1958 J. H. RICHARDSON 2,825,818

GAS PHOTOTUBE CIRCUIT

Filed Dec. 29, 1955

WITNESSES:
Ralph Carlisle Smith
Robert D. Krohn

INVENTOR.
James H. Richardson
BY Roland A. Anderson
Attorney

United States Patent Office 2,825,818

Patented Mar. 4, 1958

2,825,818

GAS PHOTOTUBE CIRCUIT

James H. Richardson, Los Alamos, N. Mex., assignor to the United States of America as represented by the United States Atomic Energy Commission Application December 29, 1955, Serial No. 556,372

2 Claims. (Cl. 250—219)

Figure 1:
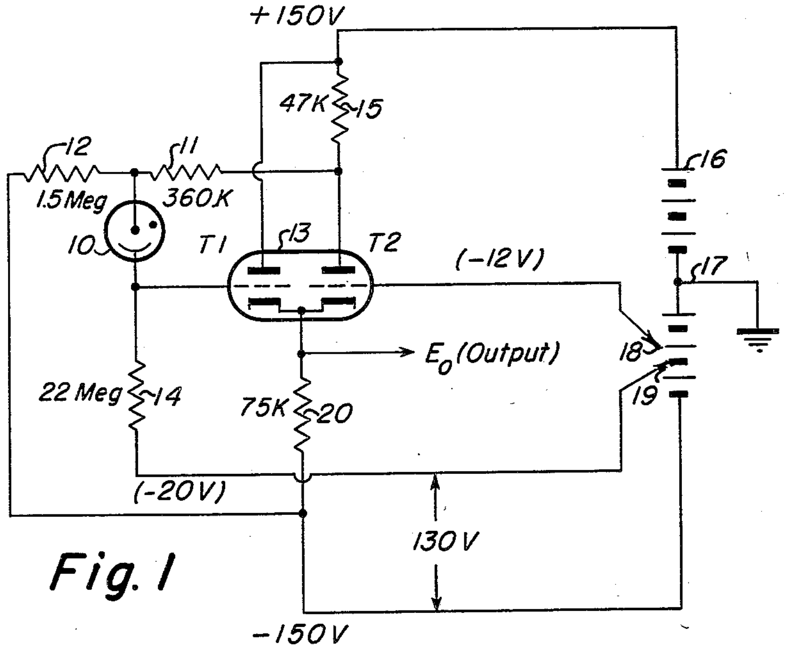

The present invention relates to electronic circuits incorporating a light sensitive device to provide an output voltage of a binary nature and in particular to a sensitive phototube circuit in which the sensitivity of the phototube is variable according to the light level.

In certain commercial and scientific applications information stored on paper tape or punched cards is "read out" in a machine such as an electronic computer by passing the tape or cards between a light source and a phototube. The tape or cards normally block off the light passing from the light source to the phototube, except that when a hole comes into register, the phototube will see the light source and issue a responsive signal to an associated circuit.

Most tapes and punched cards are light in color so that writing or printing may be displayed on their surface and be readily seen. Usually they are lightly oiled in order to provide lubrication for the punch devices which record information on the tapes or cards. As a result, most tapes and cards are not opaque, but are translucent so that even when a hole is not in register some light will pass through to the phototube. To insure reliability it is desirable to have an electronic circuit which is not sensitively responsive to a light flux of a value less than a pre-selected threshold, and is sensitively responsive to all values of flux greater than the pre-selected threshold. In order to make the selection of the threshold level very positive it is desirable to use or arrange a photo sensitive element having the maximum possible light sensitivity at the "reading" level.

Photomultiplier tubes have a high sensitivity but cannot be used in most computers because of their large physical size. Cadmium sulphide photo cells do not ordinarily respond at a sufficiently rapid rate to changes of light flux. Photo-diodes and photo-transistors are too temperature sensitive to be used except in a carefully controlled environment. Therefore, a choice must be made between high vacuum phototubes and gas filled phototubes.

Gas filled phototubes are much more sensitive than high vacuum phototubes but at the usual operating voltages they have the disadvantage of an undesirably large and an inconsistent dark-current.

The present invention provides a novel circuit arrangement which permits a gas phototube to be used without large dark-currents when the light level is low, which also provides a very sharp adjustable threshold level and provides output stability without regard to light fluctuations below the threshold level. The present invention also provides a novel and reliable circuit for detecting the presence of holes in cards or tapes without ambiguous "readings," and a circuit which is simpler and has fewer parts than circuits of the prior art, a substantial advantage in electronic computers.

It is therefore an object of the present invention to provide a novel electronic circuit incorporating a gas phototube suitable for use in punched tape and punched card readers.

Another object of the present invention is to provide a simple sensitive gas phototube circuit which is relatively insensitive to light flux below a certain chosen level.

Another object of the present invention is to provide binary (i. e. two level) output signals responsive to the intensity of the incident light according to whether the light is below or above a selected threshold level.

Figure 2:
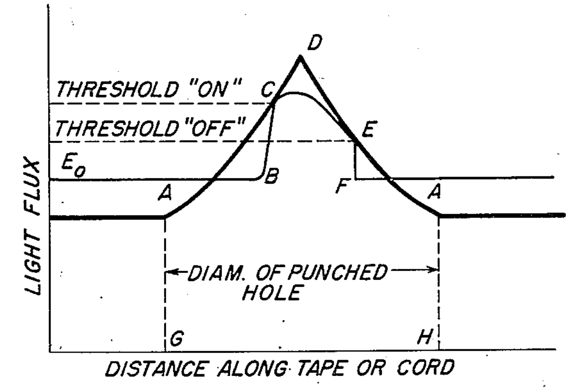
Figure 3:
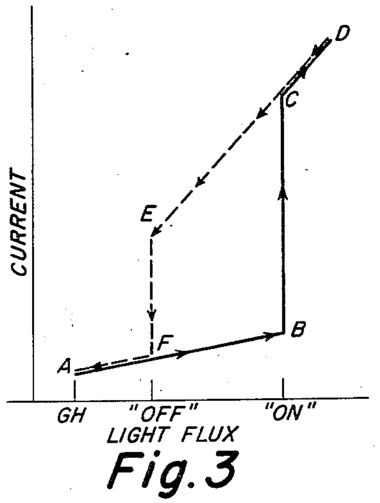

Further objects of the present invention will be apparent from the specification and from the drawings hereby made a part of the specification wherein:

Figure 1 is a schematic diagram of a preferred circuit according to the invention, and Figure 2 is a graphical representation of the circuit output while a hole in a tape or a card is passing in front of the photo cell, and Figure 3 is a graphical representation of the current through the photo cell in response to variations in the incident light flux.

By the novel arrangement of this invention a phototube is connected in an electronic circuit with an associated electronic device that operates normally in one stable state and is biased so that the expected low level light through the translucent tape or cards produces a current too small to change the operating conditions of the electronic device. However, when a hole in the tape or in the card begins to pass in front of the phototube and the light level subsequently reaches a pre-selected threshold, the phototube causes a change in the electronic device of the circuit so that it is at a second stable state. As a result of this change the voltage applied to the phototube is substantially increased causing a corresponding increase in its sensitivity and an increase in the current through the phototube. A light level greater or less than the selected threshold is detected for recording purposes by monitoring the voltage level at a point in the electronic circuit which changes as the phototube changes from one of its two operating conditions to the other.

With reference to Figure 1, a preferred embodiment of the invention, the circuit comprises a phototube 10, a twin triode 13, a source of voltage 16 and resistors 11, 12, 14, 15 and 20. Voltage source 16 may be, for example, a battery or equivalent providing 150 volts on either side of ground 17. Adjustable taps 19 and 18 may be respectively connected to the control grid of section T–1 of tube 13 thru resistor 14 and to the control grid of section T–2 of tube 13. The anode of phototube 10 is connected thru resistor 11 to the anode of T–2 and thru resistor 12 to the negative 150 volt terminal of voltage source 16. The anode of tube section T–2 is connected thru resistor 15 to the positive terminal of the high voltage source 16. The cathode of phototube 10 is connected to the control grid of tube T–1. Output voltage $E_0$ may be taken either from the cathode of tube 13 or from the anode of tube section T–2. In Figure 1, the preferred embodiment, values of components are shown for the convenience of those wishing to practice the invention. The phototube is type 927 and the duotriode is type G. E. 5844. It is understood that these values are examples only and not to be considered limitations.

In typical operation, voltage taps 18 and 19 are set so that a bias of negative 12 volts is applied to the control grid of tube section T–2 and negative 20 volts applied to the control grid of tube section T–1. Under this condition, tube section T–2 conducts and T–1 is cut off. Because of the potential drop across resistor 15 due to the current thru T-2, the voltage across gas phototube 10 is relatively low. Since the sensitivity of a gas phototube is low at low anode voltage, very little current is passed thru the tube at low light levels and the dark-current is low, since there is practically no ionization within the phototube. The voltage $E_0$ will be low indicating a low level incident illumination.

When a hole in the tape or card passes in front of the phototube, the illumination level on the phototube cathode increases by a large amount and the current thru the phototube increases. This increase in current raises the bias on the control grid of tube section T–1 and at a preselected threshold level, T–1 begins to conduct. When T–1 conducts, the increased current thru cathode resistor 20 causes the grid bias on T–2 to be relatively more negative and T–2 is cut off with a subsequent large rise in anode potential due to the cessation of current thru resistor 15. This causes the anode potential on phototube 10 to rise considerably, the sensitivity of phototube 10 is greatly increased, the current thru the phototube is increased and the bias of the control grid of tube section T–1 is greatly increased. Tube section T–2 is then held at cut-off and voltage $E_0$ is at a new higher level. Further increase of illumination causes the second voltage level to increase by an an amount which is proportional to the increase of illumination. It may be seen that the threshold level for changes in phototube sensitivity may be set by judicious selection of the bias voltage applied to the control grids of tube 13.

As the hole in the tape or card passes by and the light intensity decreases, the voltage at the control grid of tube section T–1 will decrease and the output voltage $E_0$ will decrease correspondingly. When the light level is at a new threshold level substantially lower than the first, tube section T–1 will cut-off and the current will instantaneously transfer back to the tube section T–2 causing the output voltage to step to its initial voltage level and reducing the voltage drop across resistor 15. Initial conditions are restored. The second threshold is lower than the first because of the common cathode resistor coupling between T–1 and T–2.

In order to obtain a large voltage swing at the grid of tube section T–1, a very large grid resistor 14 is required. For the preferred embodiment, it has been found that 22 megohms is a practical value. With such a large grid resistor, care must be taken to reduce the grid current of T–1 to a small value as conditions will be similar to the operation of an electrometer tube. Thus the anode voltage and cathode current is kept lower than allowed by tube ratings and the heater voltage is reduced from the suggested operating level. In the preferred embodiment the heater voltage is reduced about 15%.

With reference to Figure 2, the variation of $E_0$ with the movement of a hole in the tape or card across the face of the phototube is shown.

The hole diameter is represented by GH and the voltage $E_0$ by the line labeled as such. The heavy line represents the light flux, which rises as the whole passes by. Although the light flux level is rising from point G, the level of $E_0$ remains essentially constant until the light level reaches the "on" threshold at C because of the low sensitivity of the phototube below threshold. At this time tube section T–2 is cut off and the voltage $E_0$ approximates the light level curve CDE. Any undulation in curve CDE will not appear on the output as separate pulses, unless the undulations fall below level E; circuits detecting the output are set sensitive only to the threshold levels when $E_0$ is taken from the common cathode and when $E_0$ is taken from the anode of T–2, the circuit is self-stabilizing. When the light flux reaches level E, the second or "off" threshold, tube secton T–2 begins to conduct and initial conditions are restored.

With reference to Figure 3, a graphical representation of phototube current vs. lumens is shown. The letters in Figure 3 corresponds to the same letters in Figure 2 as regards light level. From A to B in Figure 3, the light level is below the "on" threshold. At B, the "on" threshold is reached and the phototube current rises rapidly to level C where the current then follows the light flux CDE. At flux level E, the "off" threshold is reached and the phototube current immediately falls to level F, and on return to A the initial conditions are restored.

Thus it can be seen from the foregoing that a binary system is achieved and that the circuit of this invention issues essentially two discrete voltage levels which define either a "hole" or "no hole" condition without uncertainty. Therefore the light passing thru the translucent card or tape does not appear as a possible signal nor does a moderate amount of fuze in the punched hole cause light undulations of sufficient magnitude to make it appear that several holes have passed by instead of one.

It is apparent that those skilled in the art can modify the circuit herein illustrated to achieve the function of the present invention without departing from the teachings herein. For example, voltage $E_0$ can be taken from the anode of tube section T–2 in which case the circuit will be more nearly binary as the voltage $E_0$ will not approximate the light flux but will tend to be constant at the second level. This connection depends upon the desire to have a low impedance or a high impedance output. The cathode coupling of T–1 to T–2 could be by different means also. Other switching means which will give essentially the same results as tube 13 could be used. Under certain conditions it will be desirable to put an anode resistor in the anode circuit of T–1, depending upon the voltage applied. For example, a 20,000 ohm resistor could be used in the circuit of Figure 1. Thus it is intended that the scope of the present invention not be limited to the preferred embodiment described in the foregoing but only by the appended claims.

What is claimed is:

1. A binary device for providing alternative output voltages corresponding to incident light intensities below and above a selected threshold level comprising a first triode, a second triode, a gas phototube, and a source of potential, the cathodes of the triodes being connected together and to one end of a common cathode load resistor, and other end of the cathode load resistor being connected to the negative terminal of said source of potential, the anode of the first triode being connected to one end of an anode load resistor and the other end of the anode load resistor being connected to the positive terminal of the source of potential, the anode of the second triode being directly connected to the positive terminal of the source of potential, the grid of the first triode being directly connected to a point of intermediate potential on said potential source, a voltage divider network consisting of first and second resistors having one end of each being electrically connected together, the other end of one of the resistors being connected to the junction between the first tube anode and the anode load resistor, and the other end of the second resistor being connected to the negative terminal of said source of potential, said gas phototube having an anode and a cathode, said phototube anode being directly connected to the junction of said network first and second resistors, said phototube cathode being connected directly to the second triode grid, and a grid leak resistor connected between the second triode grid and a selected intermediate point of potential on said potential source.

2. A device for providing a first output voltage in response to a light intensity below a selected level and a second output voltage in response to a light intensity above said selected level comprising first and second triode electron tubes, the cathodes of the triodes being connected together and to a common cathode load resistor, an anode load resistor connecting the anode of the second triode with a source of anode potential, a direct electrical connection between the control grid of the second triode and a source of bias potential having a value above cut-off, a direct electrical connection between the anode of the first triode and the source of anode potential, a pair of resistors serially connected together and between the anode of the first triode and the negative terminal of the source of anode potential, a gas phototube having an anode and a cathode, means electrically connecting the phototube anode to the junction between the said pair of resistors, means connecting the phototube cathode to the control grid of the second triode, and a grid leak resistor connecting the grid of the second triode to a bias source having a value below cut-off whereby conduction of the phototube due to incident light raises the value of bias on the control grid of the second triode, and when the light intensity reaches a selected value the second triode starts to conduct thereby increasing the negative bias on the first triode and causing an increase of potential across the gas phototube and by such regenerative action causing a swift transfer of conduction from the first tube to the second tube.

References Cited in the file of this patent

UNITED STATES PATENTS

| | | |
|---|---|---|
| 2,573,405 | Clark | Oct. 30, 1951 |
| 2,614,227 | Bordewieck et al. | Oct. 14, 1952 |
| 2,749,533 | Daniels | June 5, 1956 |

FOREIGN PATENTS

| | | |
|---|---|---|
| 699,922 | Great Britain | Nov. 18, 1953 |